(12) United States Patent
Jain et al.

(10) Patent No.: US 7,610,480 B2
(45) Date of Patent: *Oct. 27, 2009

(54) SYSTEM AND METHOD FOR CONTROLLING BOOT-UP PROCESS IN A COMMUNICATIONS NETWORK SWITCH

(75) Inventors: Prakash Jain, Cupertino, CA (US); Trinh N. Minh, Irvine, CA (US)

(73) Assignee: Alcatel Lucent, Paris (FR)

( * ) Notice: Subject to any disclaimer, the term of this patent is extended or adjusted under 35 U.S.C. 154(b) by 549 days.

This patent is subject to a terminal disclaimer.

(21) Appl. No.: 11/388,612

(22) Filed: Mar. 24, 2006

(65) Prior Publication Data

US 2006/0224877 A1    Oct. 5, 2006

Related U.S. Application Data

(60) Provisional application No. 60/667,549, filed on Apr. 1, 2005.

(51) Int. Cl.
    *G06F 15/177* (2006.01)
(52) U.S. Cl. .......................................... 713/2; 370/254
(58) Field of Classification Search ...................... 713/1, 713/2; 370/254
See application file for complete search history.

(56) References Cited

U.S. PATENT DOCUMENTS

| | | | |
|---|---|---|---|
| 5,884,041 A | 3/1999 | Hurwitz | |
| 6,243,756 B1 | 6/2001 | Whitmire et al. | |
| 6,324,161 B1 * | 11/2001 | Kirch | 370/217 |
| 7,228,345 B2 * | 6/2007 | Larson et al. | 709/222 |
| 2002/0046267 A1 | 4/2002 | Andra et al. | |
| 2002/0144177 A1 | 10/2002 | Kondo et al. | |
| 2003/0131227 A1 | 7/2003 | Gardiner et al. | |
| 2003/0215243 A1 | 11/2003 | Booth | |
| 2006/0224754 A1 * | 10/2006 | Jain et al. | 709/230 |

OTHER PUBLICATIONS

European Search Report; EP 1 708 436 A3; EP Application No. 06 00 6820.2; Search Completed Aug. 30, 2006; document includes four pages.

* cited by examiner

*Primary Examiner*—Chun Cao
*Assistant Examiner*—Albert Wang
(74) *Attorney, Agent, or Firm*—The Capitol Patent & Trademark Law Firm, PLLC

(57) ABSTRACT

A system and method for controlling an Ethernet node's boot-up process. Upon detecting a system reset condition with respect to the Ethernet node, a link down condition is effectuated on at least a portion of the link ports of the Ethernet node. Initialization and configuration of system switch software continues to take place in response to the system reset condition. Responsive to the link down condition, network traffic on the link ports is discontinued. Upon completion of the system software configuration, a link up condition is effectuated on the link ports, whereupon network traffic on the link ports may recommence.

23 Claims, 4 Drawing Sheets

SYSTEM AND METHOD FOR CONTROLLING BOOT-UP PROCESS IN A COMMUNICATIONS NETWORK SWITCH

PRIORITY UNDER 35 U.S.C. §119(e) & 37 C.F.R. §1.78

This nonprovisional application claims priority based upon the following prior United States provisional patent application entitled: ETHERNET PHY PORT HARDWARE PRE-CONFIGURATION DURING HARDWARE BOOTUP, Application No. 60/667,549, filed Apr. 1, 2005, in the name of Prakash Jain, which is hereby incorporated by reference for all purposes.

CROSS-REFERENCE TO RELATED APPLICATION(S)

This application discloses subject matter related to the subject matter disclosed in the following commonly owned co-pending patent application(s): (i) "SYSTEM AND METHOD FOR CONTROLLING BOOT-UP PROCESS IN A COMMUNICATIONS NETWORK SWITCH USING PRECONFIGURATION OF PORT HARDWARE," filed even date herewith, Ser. No. 11/388,611, in the name(s) of: Prakash Jain and Trinh Minh, which is (are) hereby incorporated by reference.

BACKGROUND OF THE INVENTION

1. Technical Field of the Invention

The present invention generally relates to communications networks. More particularly, and not by way of any limitation, the present invention is directed to system and method for controlling boot-up process in a communications network entity such as an Ethernet node.

2. Description of Related Art

When a communications network entity such as an Ethernet node (e.g., an Ethernet switch/router) is set in a reboot state, its link port hardware may exhibit certain voltage levels on the links associated therewith that may be sensed by other network entities connected to the Ethernet node as being indicative of operational links, while the system software of the Ethernet node is still undergoing initialization and configuration. Accordingly, the other network entities including remote devices may continue to transmit data traffic towards the Ethernet node that is undergoing boot-up. It is known that such a boot-up behavior can cause numerous network problems. For instance, a remote device being serviced by the Ethernet node may start sending the network traffic on a port interface that has not been properly processed, thereby potentially resulting in lost traffic. Also, based on the detection of a false operational condition of a switch port, a change in the network topology may be sensed, although the change is erroneous in fact. This situation may cause higher convergence times with respect to the switching and routing protocols operating in the network. Similar network problems are also known to exist even where redundant interfaces are available for the ports that are newly coming up in a booting process. Additionally, where advanced techniques such as load balancing or link aggregation are implemented, the potential for further complications in the network increases significantly.

SUMMARY OF THE INVENTION

Embodiments of the present disclosure are directed to a system and method for controlling an Ethernet node's boot-up process. Upon detecting a system reset condition (including, e.g., power-on or boot-up condition) with respect to the Ethernet node, a link down condition is effectuated for a certain period of time on at least a portion of the link ports of the Ethernet node. Initialization and configuration of system switch software continues to take place in response to the system reset condition. Responsive to the link down condition, network traffic on the link ports is discontinued. Upon completion of the system software configuration, a link up condition is effectuated on the link ports, whereupon network traffic on the link ports may recommence.

In one aspect, the present invention is directed to a method of controlling an Ethernet node's boot-up process, comprising: upon detecting a system reset condition with respect to the Ethernet node, effectuating a link down condition on at least a portion of link ports of the Ethernet node, whereupon network traffic at the link ports may preferably be discontinued; completing configuration of system software associated with the Ethernet node, the configuration taking place responsive to the system reset condition; and upon completion of the configuration, effectuating a link up condition on the link ports of the Ethernet node.

Another embodiment is directed to a system for controlling an Ethernet node's boot-up process, comprising: means for effectuating a link down condition on at least a potion of link ports of the Ethernet node, the means operating responsive to detecting a system reset condition with respect to the Ethernet node; and means for effectuating a link up condition on the link ports of the Ethernet node in response to receiving an indication that configuration of system software associated with the Ethernet node has been completed, the configuration taking place responsive to the system reset condition.

A still further embodiment is directed to a network node operable in an Ethernet environment, comprising: a plurality of link ports, wherein at least one link port is operable for coupling with a remote device via an Ethernet link; a first structure for driving a first logic level on the at least one link port responsive to detecting a system reset condition with respect to the network node, whereupon the remote device is operable to discontinue network traffic on the Ethernet link; and a second structure for driving a second logic level on the at least one link port responsive to receiving an indication that configuration of system software associated with the network node has been completed, the configuration having taken place responsive to the system reset condition, whereupon the remote device is operable to resume network traffic on the Ethernet link.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
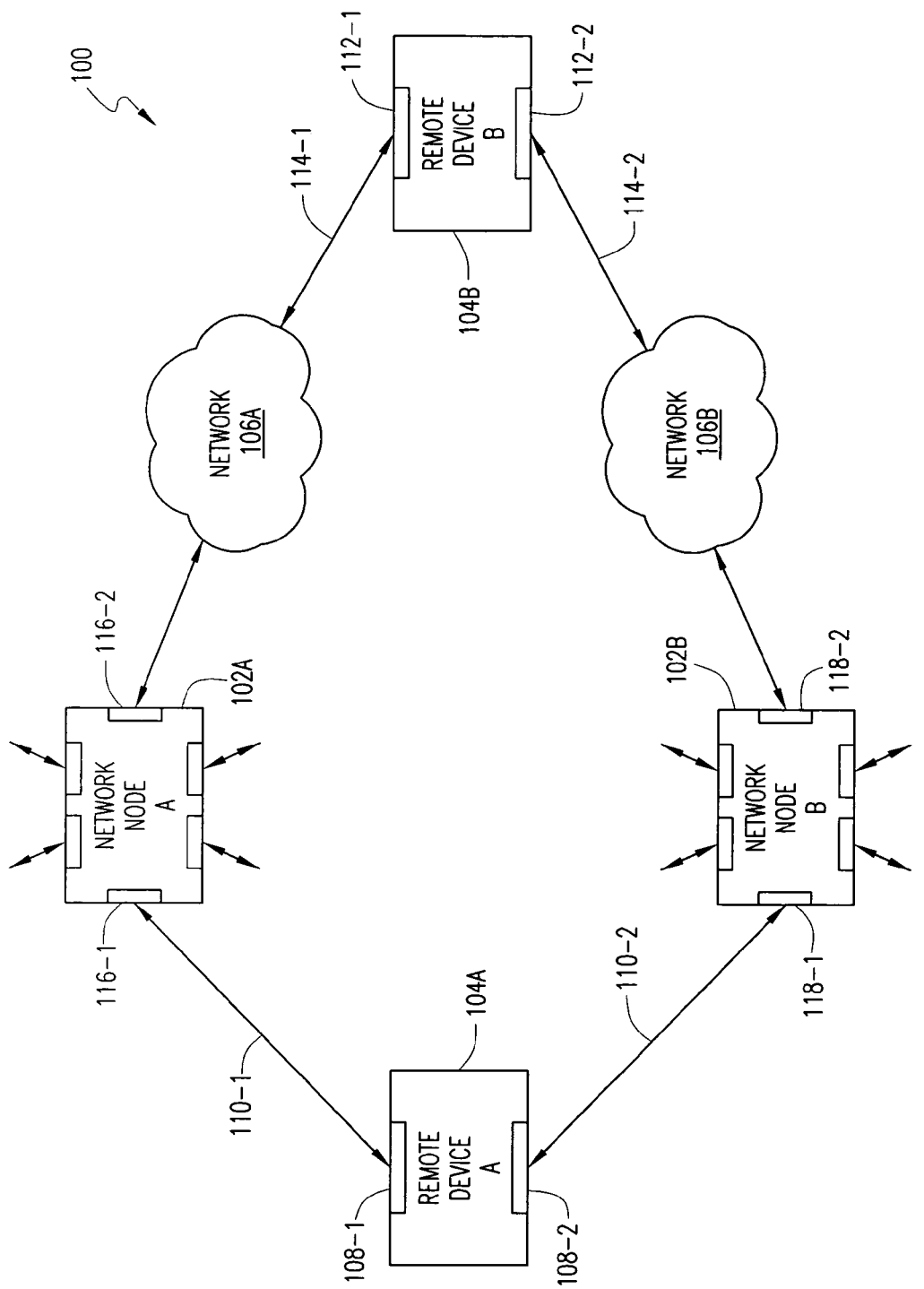
FIG. 1 is an exemplary network environment having one or more Ethernet nodes wherein an embodiment of the present invention may be implemented.

Embodiments of the invention will now be described with reference to various examples of how the embodiments can best be made and used. Like reference numerals are used throughout the description and several views of the drawings to indicate like or corresponding parts, wherein the various elements are not necessarily drawn to scale. Referring now to FIG. 1 in particular, shown therein is an exemplary network environment 100 having one or more Ethernet nodes wherein an embodiment of the present invention may be implemented. Reference numerals 102A and 102B refer to entities that are exemplary of two Ethernet nodes A and B having the Layer 2 and/or Layer 3 functionality (i.e., switching and routing), which may also be generally referred to as "network nodes" for purposes of the present patent disclosure. Network node A 102A and network node B 102B may be disposed in any known or heretofore unknown Ethernet arrangement(s) and/or configuration(s), and are operable to serve a remote device A 104A with respect to network traffic generated by or directed to it. Remote device A 104A may comprise one or more active Ethernet link ports, e.g., port 108-1, as well as one or more standby Ethernet link ports, e.g., port 108-2, for effectuating fail-over between an active interface and a standby interface.

By way of illustration, network node A 102A may be designated as a primary or active node operable to serve remote device 104A via a link 110-1 (i.e., active interface). Likewise, network node B 102B may be designated as a secondary or standby node operable to serve remote device 104A via a link 110-2 (i.e., standby interface). Each network node 102A or 102B may be comprised of a plurality of link ports for effectuating interfaces with one or more remote devices such as, e.g., remote device 104A, and/or one or more other network nodes that may be disposed in separate network portions 106A or 106B. It should be apparent to one skilled in the art that network portions 106A and 106B may share one or more common network segments in some implementations. Additionally, the networks in which network nodes 102A and/or 102B are disposed may themselves be integrated within network portions 106A and/or 106B. Regardless of the specific network topology and configuration of the networks described herein, however, remote device A 104A is operable to communicate with another remote device, e.g., remote device B 104B, via an active end-to-end path and a standby end-to-end path. In order to effectuate such an arrangement, remote device 104B is also deemed to comprise an active port 112-1 for interfacing with network portion 106A via a primary link 114-1 and a standby port 112-2 for interfacing with network portion 106B via a secondary link 114-2.

As alluded to before, network nodes 102A and 102B may each have a number of link ports, some of which may be for interfacing with remote devices while others may be for interfacing with networks 106A and 106B, respectively. By way of illustration, link ports 116-1, 118-1 associated with network nodes 102A and 102B, respectively, are operable with respect to network traffic from or to remote device 104A. In similar fashion, link ports 116-2, 118-2 associated with network nodes 102A and 102B, respectively, are operable with respect to the network-side traffic.

When network node 102A is down for some reason, e.g., a catastrophic switch software and/or hardware failure, reset, power down, rebooting, etc., its link port interfaces are deactivated or de-energized, including the device-side and network-side interfaces. Accordingly, upon sensing the link down condition on link 110-1, remote device 104A switches over to its hot standby port 108-2 for communicating with remote device 104B via network node 102B. When network node 102A is powered up again (i.e., power-on or system reset condition), it engages in a controlled boot-up process thereafter, as will be set forth in detail below, such that its link ports do not exhibit spurious logic conditions that may cause the interfacing entities (i.e., remote devices as well as other network nodes) to commence network traffic while the switch software (i.e., system software) is still in an incomplete operational state. As pointed out in the Background section of the present disclosure, such a situation gives rise to various deleterious effects with respect to the integrity of the traffic received at the network node.

Figure 2:
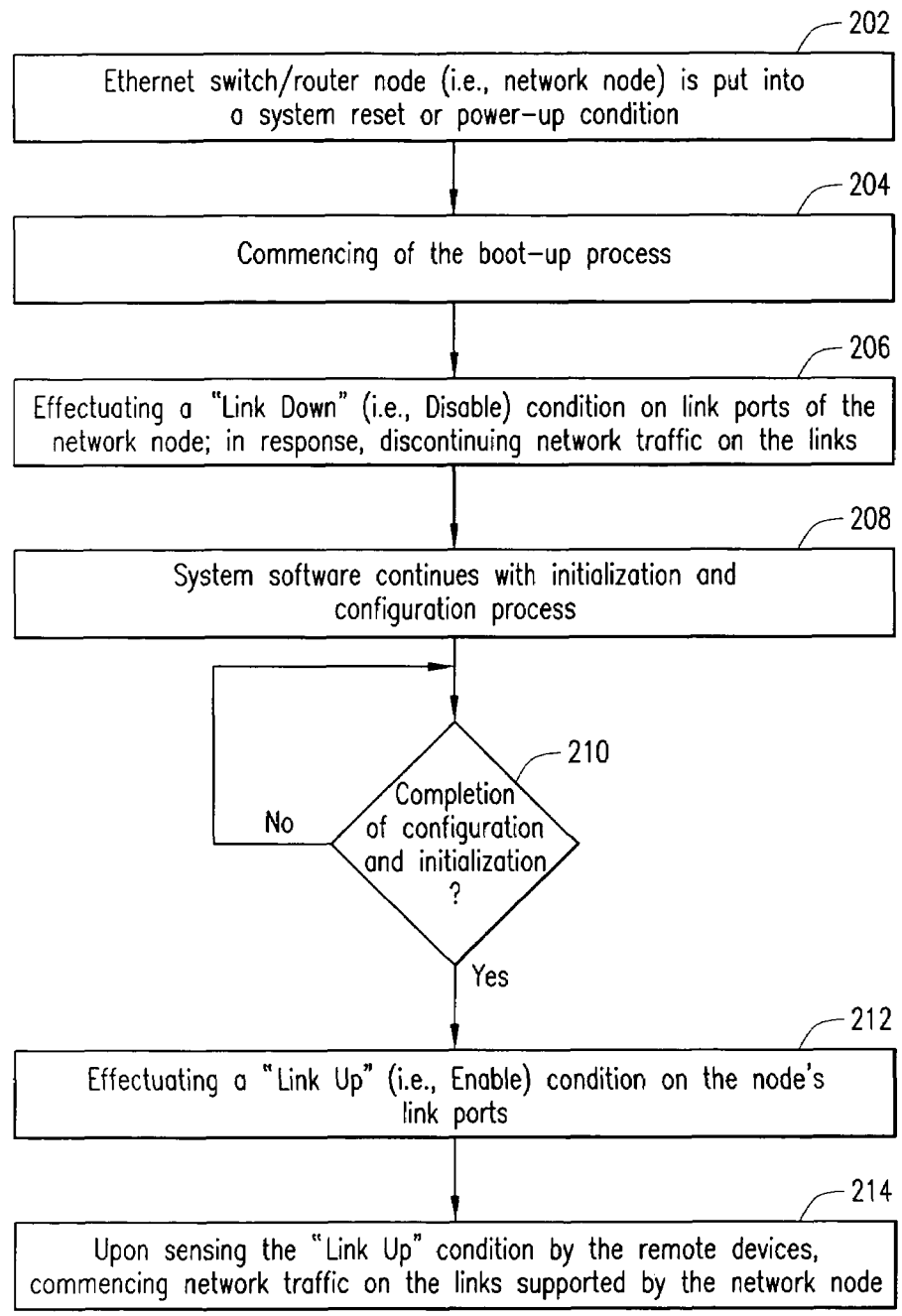
FIG. 2 is a flowchart of a scheme for controlling boot-up process of an Ethernet node in accordance with one embodiment.

FIG. 2 is a flowchart of a scheme for controlling boot-up process of an Ethernet node in accordance with one embodiment. When the Ethernet node (such as, e.g., network node 102A described above in reference to FIG. 1) is put into a system reset or power-up condition, the boot-up process involving initialization and configuration of both hardware and system software is commenced (blocks 202 and 204). Upon detecting the reset condition and in response thereto, a "Link Down" condition is effectuated on at least a portion of the link ports of the network node. When the Link Down condition is sensed by the entities (i.e., devices and nodes) connected to the network node via respective links, network traffic on the links is discontinued (block 206). That is, e.g., a remote device that is transmitting network traffic via a particular link to the network node that has initiated the boot-up processes may cease data transmission on that interface. In one implementation, the Link Down condition may be effectuated by maintaining an appropriate logic level on a particular pin (e.g., TX DISABLE pin) associated with a physical layer ("PHY") device of the network node that is responsible for interfacing with at least a portion of the link ports. Depending on how the hardware is realized, the logic level may comprise a logic high (e.g., a particular voltage level) for assertion (i.e., active high). In particular, this implementation is applicable with respect to Small Form-factor Pluggable (SFP) modules for interfacing with fiber-based links (i.e., "fiber ports"). For copper-based 10/10/1000BASE-T ports (i.e., "copper ports"), hardware preconfigurable options are more relevant as will be described below.

While the Link Down (or, disabled) condition is maintained on the link ports, the system software of the network node continues with its initialization and configuration process until it is complete and operational (blocks 208 and 210). Thereafter, upon a suitable indication to the port hardware that the system software has completed the requisite configuration process, a "Link Up" condition is effectuated on the ports (block 212). Similar to the implementation of the Link Down condition, an appropriate logic signal (e.g., a logic low) may be provided on TX DISABLE pins of the PHY device(s) interfacing with the link ports in order to indicate the "enabled" state of the ports. Upon sensing the Link Up condition by the entities, network traffic is commenced on the links of the network node, thereby advantageously avoiding data uncertainty and/or loss at the node during the boot-up period (block 214). In particular, the Link Up condition may be enforced by the system software by configuring the PHY hardware correctly, either setting appropriate bit(s) in a Complex Programmable Logic Device (CPLD) for fiber ports or in PHY chip for copper ports.

Figure 3:
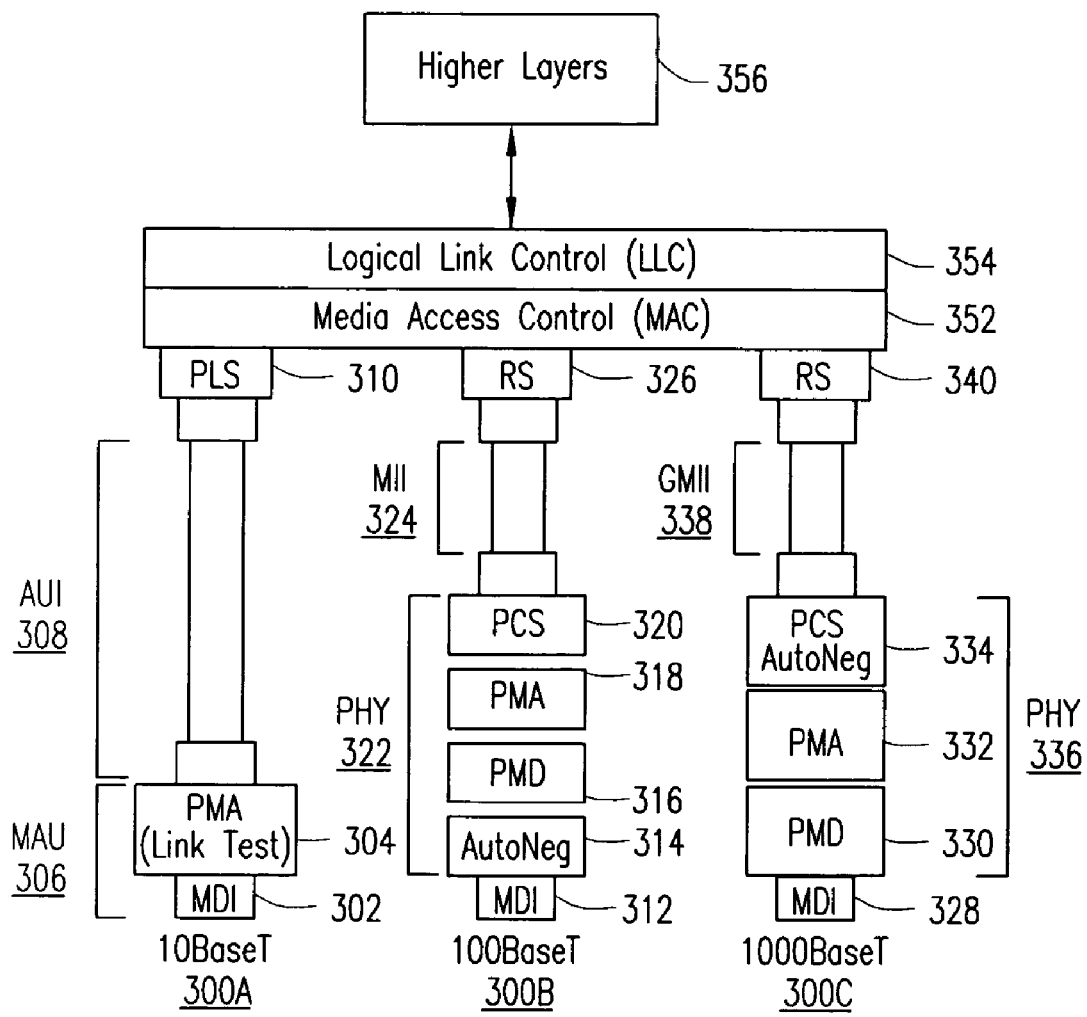
FIG. 3 depicts PHY layer functionality in exemplary Ethernet implementations.

FIG. 3 depicts PHY layer functionality in exemplary Ethernet implementations. As is well known, an Ethernet arrangement may include any number of network nodes having Layer-2 (switching) and Layer-3 (routing, IPv4 as well as IPv6) functionalities that may be implemented in accordance with a number of standards and protocols. For purposes of the present disclosure, accordingly, an exemplary Ethernet node may include a variable number of ports that are capable of interfacing with one or more types of physical media (e.g., twisted copper, optical fiber, et cetera) and are in compliance with standards such as 10BASE-T, 100BASE-T, 1000BASE-T, 1000BASE-X, etc. Also, the PHY device hardware may be embodied in a number of form factors, e.g., SFP modules, GigaBit Interface Converter (GBIC) modules, that integrate various aspects of the PHY layer functionality.

As illustrated in FIG. 3, three implementation models of PHY layer functionality are exemplified: 10BASE-T 300A, 100BASE-T 300B and 1000BASE-T 300C. In accordance with the standard Open System Interconnection or OSI model, a plurality of higher layers 356 interface with a Logical Link Control (LLC) layer 354 which in turn interfaces with a Media Access Control (MAC) layer 352. MAC layer 352 uses a variety of sublayer functionalities depending on the applicable standards to interface with the physical hardware forming a PHY device. In 10BASE-T implementation model 300A, a medium dependent interface (MDI) 302 and a physical medium attachment (PMA) 304 form a media attachment unit (MAU) 306 that forms the PHY device, which uses an attachment unit interface (AUI) 308 to couple to MAC layer 352 via a physical layer signaling (PLS) functionality 310. In 100BASE-T implementation model 300B, a Registered Jack (RJ)-45 unit forms MDI 312 that is coupled to PHY 322. As illustrated in FIG. 3, a number of functionalities and sublayers are integrated within PHY 322: auto-negotiation 314, physical medium dependent (PMD) functionality 316, PMA 318, and physical coding sublayer (PCS) 320. PHY 322 uses a medium independent interface (MII) 324 to couple to MAC layer 352 via a reconciliation sublayer (RS) 326. Likewise, an RJ-45 unit forms MDI 328 for 1000BASE-T implementation model (GigaBit Ethernet) 300C, wherein PHY 336 includes PMD functionality 330, PMA 332 and PCS 334 that integrates auto-negotiation. A GigaBit MII (GMII) 338 is operable to interface PHY 336 with MAC layer 352 via RS 340.

Accordingly, based on the foregoing discussion, it should be appreciated that PHY layer functionality may be embodied in a number of hardware implementations involving one or more integrated circuits or IC devices, each embodiment including appropriate drive circuitry for driving suitable logic levels on supported links under certain control input signals. Essentially, a "transmit (TX) control" logic circuit may be implemented in association with the physical layer hardware (i.e., a PHY/MAU chip or SFP/GBIC module), whereby the PHY functionality is maintained in a "transmit disabled" state on boot-up (preferably as soon as a reset is detected), until the system software is up and running. In one implementation where the PHY hardware has programmable logic device (PLD) functionality to control a reset pin, the PLD logic may be used to drive a suitable level on the reset pin such that it remains asserted. Since the PHY hardware in reset cannot transmit, the remote-side and network-side entities detect this condition as a link down condition. It should be appreciated that this control may be required on a port-by-port basis, and if a PHY device is operable to control multiple ports or if one reset pin controls multiple ports, additional logic may be required to properly implement the TX disable and enable conditions on each port.

In another implementation where the PHY functionality is embodied in an application-specific IC (ASIC), TX control may be achieved by modifying initial boot-up configuration of the ASIC so that TX control remains in a disabled state until system software enables it. Some of the existing PHY hardware implementations currently allow initial boot time configuration for auto-negotiation and speed (e.g., 100 Mbps, 1 Gbps, etc.). Accordingly, the device may be preconfigured for a TX DISABLED condition as default boot time configuration for the PHY ASIC using certain select pins on the chip. One skilled in the art should recognize upon reference hereto that the same result of TX DISABLED condition may also be achieved if the ASIC can be preconfigured with auto-negotiation being enabled and NULL speed (i.e., no speed) being selected during boot-up. Additional details regarding this implementation may be found in the following commonly owned co-pending patent application entitled "SYSTEM AND METHOD FOR CONTROLLING BOOT-UP PROCESS IN A COMMUNICATIONS NETWORK SWITCH USING PRECONFIGURATION OF PORT HARDWARE," filed even date herewith, Ser. No. 11/388,611, in the name(s) of: Prakash Jain and Trinh Minh, which has been cross-referenced hereinabove.

Figure 4:
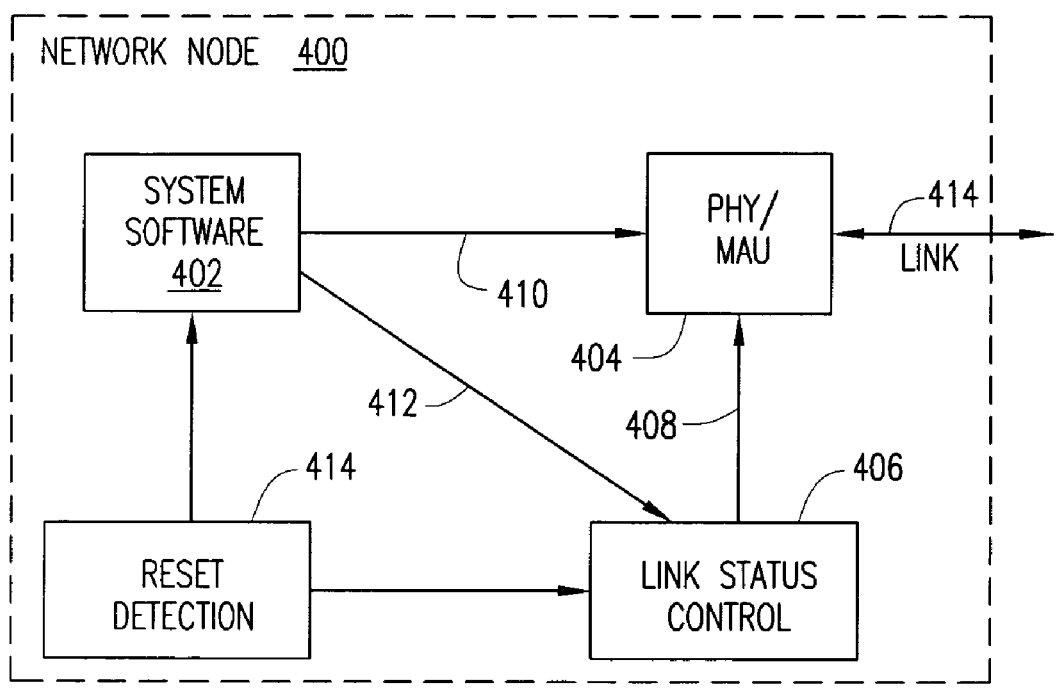
FIG. 4 is a block diagram of an Ethernet node wherein a boot-process controlling system and methodology may be implemented according to one embodiment of the present invention.

FIG. 4 is a block diagram of an exemplary Ethernet node 400 wherein a boot-process controlling system and methodology may be implemented according to one embodiment of the present invention. A reset detection module 414 is operable to interface with system switch software 402 of the Ethernet node 400, wherein a reset condition commences the software's initialization and configuration. Further, a link status control module 406 is operable responsive to the reset condition for applying suitable logic to one or more inputs 408 of a PHY/MAU device 404 such that a TX DISABLED condition is achieved with respect to a link 414 that is interfaced to a port supported by the PHY/MAU device 404. As explained in detail hereinabove, such a condition may be realized in a number of ways. Upon completion of the software initialization/configuration process, a suitable indication 410 may be provided to the PHY/MAU hardware such that the TX DISABLED condition is removed, whereupon link 414 becomes operational again with respect to network traffic thereon. Alternatively, the system software 402 may generate an indication 412 to the link status control module 406 for applying suitable logic to the PHY/MAU hardware 404 such that the supported link ports are rendered in an ENABLED state.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A method of controlling an Ethernet node's boot-up process, comprising:

upon detecting a system reset condition with respect to said Ethernet node, effectuating a link down condition on at least a portion of link ports of said Ethernet node, whereupon network traffic at said link ports is discontinued;

completing configuration of system software associated with said Ethernet node, said configuration taking place responsive to said system reset condition; and upon completion of said configuration, effectuating a link up condition on said link ports of said Ethernet node;

wherein said link down condition is effectuated by maintaining an appropriate logic level on a TX DISABLE pin associated with a physical layer (PHY) device that is responsible for interfacing with said at least a portion of said link ports.

2. The method of controlling an Ethernet node's boot-up process as recited in claim 1, wherein said link down condition is effectuated without delay in response to said system reset condition.

3. The method of controlling an Ethernet node's boot-up process as recited in claim 1, wherein said link ports comprise a plurality of Gigabit Ethernet ports.

4. The method of controlling an Ethernet node's boot-up process as recited in claim 1, wherein said link ports comprise a plurality of 1000BASE-X Small Form-factor Pluggable (SFP) ports.

5. The method of controlling an Ethernet node's boot-up process as recited in claim 1, wherein said link ports comprise a plurality of Registered Jack-45 (RJ-45) ports operable with at least one of 10BASE-T, 100BASE-T, or 1000BASE-T Ethernet standards.

6. The method of controlling an Ethernet node's boot-up process as recited in claim 1, wherein network traffic at said link ports is discontinued upon effectuating said link down condition.

7. The method of controlling an Ethernet node's boot-up process as recited in claim 1, wherein network traffic at said link ports is resumed upon effectuating said link up condition.

8. The method of controlling an Ethernet node's boot-up process as recited in claim 1, wherein said logic level comprises a logic high for assertion.

9. The method of controlling an Ethernet node's boot-up process as recited in claim 1, wherein said link up condition is effectuated by inverting said logic level on said TX DISABLE pin upon receiving an indication that said configuration of said system software has been completed.

10. A system for controlling an Ethernet node's boot-up process, comprising:
    means for effectuating a link down condition on at least a portion of link ports of said Ethernet node, said means operating responsive to detecting a system reset condition with respect to said Ethernet node; and
    means for effectuating a link up condition on said link ports of said Ethernet node in response to receiving an indication that configuration of system software associated with said Ethernet node has been completed, said configuration taking place responsive to said system reset condition;
    wherein said link down condition is effectuated by maintaining an appropriate logic level on a TX DISABLE pin associated with a physical layer (PHY) device that is responsible for interfacing with said at least a portion of said link ports.

11. The system for controlling an Ethernet node's boot-up process as recited in claim 10, wherein said link down condition is effectuated without delay in response to detecting said system reset condition.

12. The system for controlling an Ethernet node's boot-up process as recited in claim 10, wherein said link ports comprise a plurality of Gigabit Ethernet ports.

13. The system for controlling an Ethernet node's boot-up process as recited in claim 10, wherein said link ports comprise a plurality of 1000BASE-X Small Form-factor Pluggable (SFP) ports.

14. The system for controlling an Ethernet node's boot-up process as recited in claim 10, wherein said link ports comprise a plurality of Registered Jack-45 (RJ-45) ports operable with at least one of 10 BASE-T, 100BASE-T, or 1000BASE-T Ethernet standards.

15. The system for controlling an Ethernet node's boot-up process as recited in claim 10, wherein said logic level comprises a logic high for assertion.

16. The system for controlling an Ethernet node's boot-up process as recited in claim 10, wherein said link up condition is effectuated by inverting said logic level on said TX DISABLE pin upon receiving said indication that said configuration of said system software has been completed.

17. A network node operable in an Ethernet environment, comprising:
    a plurality of link ports, wherein at least one link port is operable for coupling with a remote device via an Ethernet link;
    a first structure for driving a first logic level on said at least one link port responsive to detecting a system reset condition with respect to said network node, whereupon said remote device is operable to discontinue network traffic on said Ethernet link; and
    a second structure for driving a second logic level on said at least one link port responsive to receiving an indication that configuration of system software associated with said network node has been completed, said configuration having taken place responsive to said system reset condition, whereupon said remote device is operable to resume network traffic on said Ethernet link;
    wherein said first logic level is driven by said first structure on a TX DISABLE pin associated with a physical layer (PHY) device that is responsible for interfacing with said at least one link port.

18. The network node operable in an Ethernet environment as recited in claim 17, wherein said link ports comprise a plurality of Gigabit Ethernet ports.

19. The network node operable in an Ethernet environment as recited in claim 17, wherein said link ports comprise a plurality of 1000BASE-X Small Form-factor Pluggable (SFP) ports.

20. The network node operable in an Ethernet environment as recited in claim 17, wherein said link ports comprise a plurality of Registered Jack-45 (RJ-45) ports operable with at least one of 10BASE-T, 100BASE-T, or 1000BASE-T Ethernet standards.

21. The network node operable in an Ethernet environment as recited in claim 17, wherein said first and second structures are implemented in said physical layer (PHY) device that is responsible for interfacing with said at least one link port.

22. The network node operable in an Ethernet environment as recited in claim 17, wherein said first logic level comprises a logic high.

23. The network node operable in an Ethernet environment as recited in claim 22, wherein said second logic level comprises a logic low.

\* \* \* \* \*

UNITED STATES PATENT AND TRADEMARK OFFICE
CERTIFICATE OF CORRECTION

PATENT NO. : 7,610,480 B2
APPLICATION NO. : 11/388612
DATED : October 27, 2009
INVENTOR(S) : Jain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 766 days.

Signed and Sealed this

Twelfth Day of October, 2010

David J. Kappos
*Director of the United States Patent and Trademark Office*